United States Patent [19]

Hefling

[11] 4,334,462

[45] Jun. 15, 1982

[54] GAS-FIRED COOKING APPARATUS

[75] Inventor: Dennis V. Hefling, Wichita, Kans.

[73] Assignee: The Coleman Company, Inc., Wichita, Kans.

[21] Appl. No.: 208,829

[22] Filed: Nov. 13, 1980

[51] Int. Cl.³ .............................................. A47J 37/06
[52] U.S. Cl. ...................................... 99/385; 99/352; 99/400; 99/446; 99/448; 99/467; 126/9 R; 126/25 R; 126/41 R
[58] Field of Search ................. 99/352, 446, 385, 400, 99/467, 448; 126/25 R, 41 R, 9 R

[56] References Cited

U.S. PATENT DOCUMENTS 3,333,526  8/1967  Kirkpatrick ..................... 99/446 X
4,094,295  6/1978  Boswell .................................. 99/446

FOREIGN PATENT DOCUMENTS 567366  10/1975  Switzerland ........................... 99/446

Primary Examiner—Billy J. Wilhite

[57] ABSTRACT

A cooking apparatus for barbecuing or smoking includes a cooking container, a support collar, and a support base which are removably secured together. The support base and the cooking container are each provided with a central air opening, and the cooking container and the support base are clamped against the support collar by a stud which extends through the air openings. The clamping force provided by the stud is transmitted to the cooking container and to the support base by compressible and resilient spring plates within the cooking container and the support base, and each spring plate is provided with an air passage to permit air to flow from the base, through the central air openings, and into the cooking container. A burner assembly may be removably secured to the spring plate in the cooking container by the stud.

7 Claims, 5 Drawing Figures

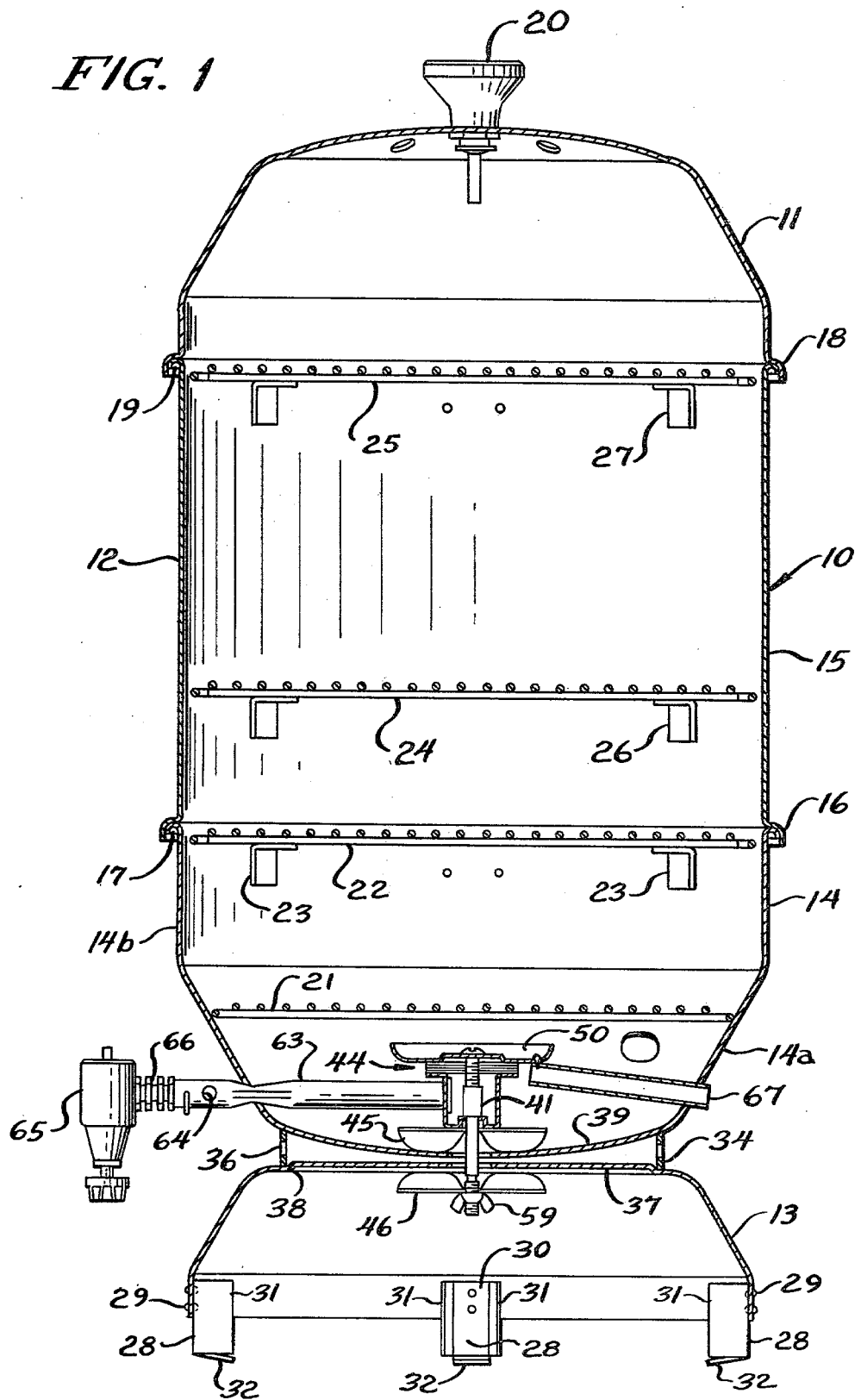

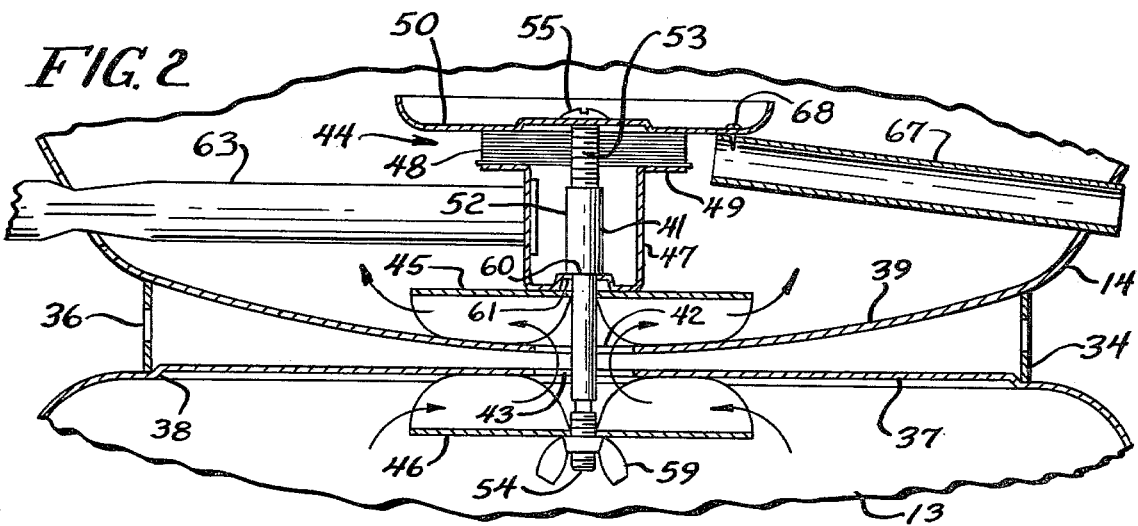

GAS-FIRED COOKING APPARATUS

BACKGROUND AND SUMMARY

This invention relates to a gas-fired cooking apparatus, and, more particularly, to a gas-fired cooking apparatus such as a barbecue, a smoker, or a combination barbecue and smoker.

Barbecue grills and smokers conventionally include a cooking container for holding the briquettes or cooking rock and the meat. Gas-fired barbecues and smokers include a burner assembly which is mounted in the cooking container below the rock for heating the rock. Meat juices which drip on the rock create the smoke which give the meat the barbecued flavor.

Certain design considerations are involved in barbecues and smokers. For example, the cooking container will become quite hot during cooking, and it is desirable to protect the supporting surface from this heat. Gas-fired cookers require means for providing a good supply of secondary combustion air to the burner assembly. It is desirable to provide means for collecting meat drippings, and it is advantageous if the cooker can be easily disassembled for cleaning and storage.

The invention accomplishes the foregoing objections in a unique and simple manner. The cooking container is supported above the cooking surface by a support collar and a support base, and these parts and held together by a stud and a pair of spring plates. Both the cooking container and the base are provided with a central air opening for secondary combustion air, and the spring plates engage the cooking container and base around the air openings. The gas burner is mounted above the spring plate and the cooking container, and the stud extends through the burner assembly and the two spring plates and draws the spring plates together. The spring plates cover the air openings in the cooking control and shield the support surface from the radiant heat of the gas burner. The spring plates are formed to provide air passages for permitting secondary combustion air to flow from the base to the cooking container through the central air openings. Meat drippings can fall through the central openings and can be collected below the spring plates in the base.

DESCRIPTION OF THE DRAWINGS

The invention will be explained in conjunction with the illustrated embodiments shown in the attached drawings, in which FIG. 1 is a sectional elevational view of a combination barbeque-smoker grill formed in accordance with the invention;

FIG. 2 is an enlarged fragmentary sectional view of a portion of FIG. 1 showing the burner assembly and the spring plates;

FIG. 3 is an enlarged side elevational view of one of the spring plates;

FIG. 4 is a top plan view of one of the spring plates; and

FIG. 5 is a side elevational view, partially broken away, of the support collar.

DESCRIPTION OF SPECIFIC EMBODIMENT

The numeral 10 designates generally a combination barbeque and smoker grill which includes a cover 11, a cooking container 12, and a support base 13. The cooking container 12 includes a bowl-shaped bottom portion 14 and a generally cylindrical extension sleeve 15. The lower edge of the extension 15 is provided with an outwardly and downwardly extending flange 16 which fits over and is supported by a rolled upper edge 17 on the bottom portion. The lower edge of the cover 11 is provided with a similar flange 18 which is supported by a rolled upper edge 19 on the extension. A knob 20 is attached to the cover for lifting the cover.

A rock grate 21 is supported within the frusto-conical portion 14a of the bottom portion 14, and a meat grate 22 is supported by brackets 23 which are attached to the upper cylindrical portion 14b of the bottom portion. Two additional meat grates 24 and 25 are supported by brackets 26 and 27, respectively, in the extension 15.

The support base 13 has an inverted bowl shape and includes four supporting feet 28 which are attached to the lower edge of the base by rivets 29. Each foot is channel-shaped and includes a central portion 30 and a pair of sides 31. A lower tab portion 32 is joined only to the central portion 30 of the channel and not to the sides and is bent downwardly slightly to form an obtuse included angle with the central portion 30. The tab portion thereby minimizes the area of contact between the base and the support surface on which the base rests and minimizes heat conduction from the base to the support surface.

The bottom portion 14 of the cooking container 12 and the base 13 are separated by a cylindrical support collar 34. Referring to FIG. 5, the support collar can be formed from a flat metal strip which is bent into a cylindrical shape. The ends of the strip can be secured together by rivets which extend through rivet openings 35. Air openings 36 are provided in the support collar to provide cooling air to the space between the cooking container and the base and to reduce heat conduction between the cooking container and the base. The flat upper surface 37 of the base can be provided with a vertical shoulder 38 to locate the support collar, and the upper edge of the support collar engages and supports the lower surface 39 of the bottom portion of the cooking container.

The bottom portion 14 of the cooking container, the support collar 34, and the base 13 are clamped together by a stud 41 which extends through a central opening 42 in the bottom surface of the bottom portion 14 and a central opening 43 in the top surface of the base (see also FIG. 2). The stud extends through a burner assembly 44 in the bottom portion 14 and a pair of spring plates 45 and 46.

The burner assembly 44 is a conventional propane gas burner assembly and includes a cup-shaped burner box or distribution chamber 47 (FIG. 2), a plurality of burner rings 48 which are supported by an annular upper flange 49 of the burner box 47, and an upper burner plates or burner bowl 50. The burner rings 48 consist of alternating flat and corrugated rings or annular plates which are well known in the art, and gas flows from the burner box 47 through the corrugations to the outside edge of the burner rings.

The stud 41 includes a central unthreaded portion 52, a screw 53 which is threadedly engaged with the central portion 52, and a lower threaded portion 54. The screw 53 extends through the burner bowl 50 and the burner rings 48, and the screw head 55 holds the burner bowl and the burner rings against the upper flange of the burner box.

Referring now to FIGS. 3 and 4, each of the spring plates 45 and 46 includes four surface-engaging portions 56 and four U-shaped passage-providing portions 57 which separate the surface-engaging portions. The passage-providing portions are spaced 90° apart, and each surface-engaging portion curves smoothly between a pair of U-shaped passage-providing portions. A stud opening 58 is provided through the center of the plate. The spring plates are advantageously formed from spring metal, and one specific embodiment was formed from 0.035" aluminized steel plate.

Returning to FIG. 2, the stud 41 extends through the spring plates 45 and 46, and a wing nut 59 is threaded onto the lower end of the stud. The unthreaded central portion 52 of the stud includes an annular shoulder 60 which engages an annular embossment 61 in the bottom wall of the burner box.

When the wing nut is tightened on the stud, the burner assembly 44 and upper spring plate 45 are urged downwardly against the bottom wall of the cooking container, and the lower spring plate 46 is urged upwardly against the top wall of the base. The bottom of the cooking container and the top of the base are thereby clamped against the support collar 34 to form a rigid assembly. The spring plates are compressible and resilient, and the plates can be compressed slightly as the wing nut is tightened, thereby providing a tight connection between the cooking container, the support collar, and the base.

Gas is supplied to the burner box 47 by a mixing or venturi tube 63 which extends through an opening in the frusto-connical portion 14a of the bottom portion of the cooking container and into the burner box. The venturi tube is provided with a pair of openings 64 for entraining primary air. The particular cooking apparatus illustrated is designed for use with propane, and a propane regulator 65 is connected to the venturi tube by a finned coupling tube 66. A cylinder of liquid propane can be connected to the regulator.

A lighting tube 67 is connected to the burner bowl by a screw 68 and extends through the wall of the bottom portion of the cooking container. The lighting tube conducts gas from the burner rings to the outside of the cooker where it can be lighted to start the burner.

If the barbeque-smoker is used as a barbecue, the meat can be placed on the first meat grate 22, the extension sleeve 15 can be removed, and the cover 11 can be placed directly on the bottom portion of the cooking container. If the barbecue-smoker is used as a smoker, meat can be placed on the grates 24 or 25, and wood chips can be placed on the grate 22. In either case, volcanic rock or the like is placed on the lower grate 21 where it is heated by the burner assembly.

The upper spring plate 45 spaces the burner assembly away from the bottom of the cooking container. As indicated by the arrows by FIG. 2, secondary combustion air passes upwardly from the base, through the air passages in the lower spring plate 46, through the central openings in the base in the cooking container, and through the air passages in the upper spring plate 45 to the burner. The air passages in the spring plates extend generally perpendicularly to the axis of the central air openings in the base and the cooking container, and the air follows a circuitous or baffled path. The spring plates extend radially outwardly beyond the central air openings 42 and 43 in the cooking container and the base and act as baffles to shield the supporting surface from radiant heat from the flame which would otherwise pass through the air openings.

The burner bowl 50 spreads the flame out to provide even heat distribution across the lower grate 21 and protects the burner ports from clogging by catching meat drippings. The meat drippings burn off from the heat of the bowl.

Meat drippings which fall outside of the burner bowl are collected by the dome-shaped bottom wall of the bottom portion of the cooking container and flow through the air passages of the upper spring plate 45 to the central air openings. The drippings then fall from the lower spring plate 46 and can be collected by a pan which is placed inside the base.

When the cooker needs cleaning or when it is to be stored, the entire assembly can be disassembled merely by unscrewing the wing nut 59 and removing the stud 41. This permits the cooking container and the base to be disconnected, and the components of the burner assembly can be disassembled. The entire assembly can be reassembled by inserting the stud and tightening the wing nut.

The spring plates 45 and 46 are advantageously formed from cold-rolled steel sheeting. Each plate can be formed by positioning a steel X or cross formed of 5/16 inch diameter steel rod stock in a press. A flat, square, piece of sheet steel of appropriate square dimensions is positioned above the cross and a ½ inch thick piece of rubber, larger in length and width than the piece of sheet steel is placed on top. The press is then closed to form the spring plate shown in FIGS. 3 and 4.

While in the foregoing specification a detailed description of a specific embodiment of the invention was set forth for the purpose of illustration, it will be understood that many of the details hereingiven may be varied considerably by those skilled in the art without departing from the spirit and scope of the invention.

I claim:

1. A cooking apparatus comprising a base having an upper surface, a cooking container above the base, the cooking container having a lower surface, support means between the cooking container and the base for supporting the cooking container above the base, each of the upper surface of the base and the lower surface of the cooking container being provided with a central air opening, a first spring plate below the central opening in the upper surface of the base, a second spring plate above the central opening in the lower surface of the cooking container, said first spring plate being compressible and resilient and being provided with at least one air passage for permitting air to flow from the base through the central opening in the upper surface of the base, said second spring plate being compressible and resilient and being provided with at least one air passage for permitting air to flow from the central opening in the lower surface of the cooking container to the cooking container, and connecting means extending through the central openings for urging said spring plates together whereby said base and said cooking container are held against said support means to form an assembly.

2. The cooking apparatus of claim 1 in which said connecting means includes a threaded stud and a nut whereby said connecting means can be disconnected by removing said nut.

3. The cooking apparatus of claim 1 in which each of said spring plates includes a plurality of angularly spaced surface-engaging portions and an air-passage-providing portion between each pair of adjacent surface-engaging portions for permitting air to flow between adjacent pairs of surface-engaging portions.

4. The cooking apparatus of claim 3 in which each of said spring plates includes four surface-engaging portions and four air-passage-providing portions, the four air-passage-providing portions being spaced apart 90° to provide four air passages which extend generally perpendicularly to the axis of said air openings.

5. The cooking apparatus of claim 4 in which each of the air-passage-providing portions of said spring plates is generally U-shaped and curves smoothly into the adjacent surface-engaging portions.

6. The cooking apparatus of claim 1 including a burner assembly supporting by said second spring plate, said connecting means urging said burner assembly against said second spring plate.

7. The cooking apparatus of claim 6 in which said burner assembly includes an upper plate, said connecting means including a stud which extends through said upper burner plate and through said first and second spring plates and a nut threadedly engaged with said stud, whereby said stud can be removed and said burner assembly, spring plates, cooking container, and base can be disassembled by unscrewing said nut.

* * * * *